July 21, 1953 S. A. HAYES 2,646,063
BACK FLOW PREVENTER
Filed Nov. 15, 1949

INVENTOR.
STANLEY A. HAYES
BY
James D Christie
ATTORNEY

Patented July 21, 1953

2,646,063

UNITED STATES PATENT OFFICE 2,646,063

BACK FLOW PREVENTER

Stanley A. Hayes, Pasadena, Calif.

Application November 15, 1949, Serial No. 127,463

5 Claims. (Cl. 137—218)

This invention is concerned with preventing back flow of liquids in conduits and provides improved apparatus for this purpose. In its preferred form, the apparatus of the invention acts both as a back flow valve and a vacuum breaker.

There is a marked need, thus far unfulfilled, for a simple, rugged, and positive device for preventing back flow of liquids into water mains and other liquid carrying systems which should be protected against contamination. By way of example, sudden interruption of flow in a water main system may produce suction instead of pressure at the taps. If, for example, a garden hose submerged in a fish pond or a cesspool should be attached to the tap at the time the suction is developed, the contents of the fish pond or the cesspool may be sucked back into the water system. Such an event may occur when a water main is broken at a point considerably lower than the tap. The rush of water through the break will drain the line above the break and produce the suction. Impure liquids drawn in through the tap under these conditions may contaminate the entire water main system and be responsible for the spread of poison or disease.

I have developed a simple, rugged, positive, and inexpensive back flow device which may be incorporated in a variety of apparatus, for example, on the tap or hose bib end of a garden hose. However, the device is of general utility and may be employed in a variety of municipal, industrial and agricultural appliances and installations to prevent back flow into a system which should be kept uncontaminated. My invention contemplates the combination comprising a conduit for liquid having an inlet portion and an outlet portion, a vent in the conduit between the portions, and a flexible (and preferably resilient) diaphragm disposed across the conduit in the inlet portion adjacent the vent and having an open ended neck or nipple extending toward the outlet portion but separated therefrom when the diaphragm is undistended. The neck portion is movable into the outlet portion when the diaphragm is distended by liquid in the inlet portion. Preferably the neck fits in the outlet portion. In this fashion the vent is bridged when there is sufficient pressure of liquid from the inlet end, and normal flow of liquid through the device goes on without leakage. If the pressure on the inlet of the device is interrupted or drops to a dangerous level, the diaphragm moves back toward the inlet end and unseats its neck from the outlet end thus permitting the vent to come into operation. Ordinarily the vent will be to atmosphere.

In a preferred form of my apparatus, a perforated backing is disposed immediately behind the diaphragm on the inlet side and extending across the conduit. This perforated backing is rigid and prevents the diaphragm from collapsing back into the inlet end of the device. Preferably that portion of the backing immediately adjacent the tubular neck or nipple portion of the diaphragm is unperforated and so disposed that the neck portion seats against it when the diaphragm is undistended. Thus the inlet is completely sealed and neither liquid nor gas may be sucked back into the inlet portion if suction develops at that point.

The nipple of the diaphragm is preferably disposed on the axis of the outlet portion of the conduit so that when the diaphragm is distended the neck portion is pushed forward to seat easily in the outlet portion.

I prefer to employ a diaphragm which has its edges mounted substantially forward of its center so that when undistended it slopes backward toward the center from which the neck or nipple protrudes in a forward direction. This increases the size of the vent gap which must be bridged when the diaphragm is distended.

If desired, the diaphragm may have annular corrugations around the neck. These annular corrugations are straightened out when the diaphragm is distended to force the neck into the outlet again permitting a greater vent gap to be bridged.

When flows through the apparatus of the invention are interrupted frequently, for example, when it is installed on the hose bib end of a garden hose, resilience of the diaphragm itself is sufficient to cause it to pull the neck out of the outlet when pressure on the inlet is reduced. However, when there is a substantially continuous flow through the apparatus with only occasional interruptions, the resilient action of the diaphragm may be reinforced by a spring, say a coil spring disposed across the vent gap from the neck to the outlet. Alternatively the spring may be a helical spring imbedded in the diaphragm itself. When such separate springing means are employed the diaphragm must be flexible, but not necessarily resilient.

If desired, the perforated backing may have a forwardly extending projection or button around which the nipple on the diaphragm seats when the diaphragm is undistended. In one modification of the invention the neck on the diaphragm, preferably provided with an internal wiper ring, slides forward snugly on the projection of the backing which is of uniform cross section for a substantial distance. The projection on the backing is unperforated and extends sufficiently in the direction of the outlet that the nipple or its wiper ring acts as a seal until the neck has seated itself in the outlet. This prevents leakage of liquid through the vent at the beginning of flow through the apparatus and permits the use of larger vents.

If desired, the vent may be provided with a screen which serves as a seat for the distended diaphragm when the neck of the diaphragm is seated in the outlet conduit.

These and other aspects of my invention will be understood thoroughly in the light of the following detailed description taken in conjunction with the accompanying drawing, in which:

Fig. 1 is a longitudinal section through one form of back flow preventer of my invention, especially adapted for incorporation on the inlet end of an eductor or the like;

Fig. 2 is a longitudinal section through another form of my invention particularly adapted for installation on the inlet end of a garden hose or the like;

Figure 1:
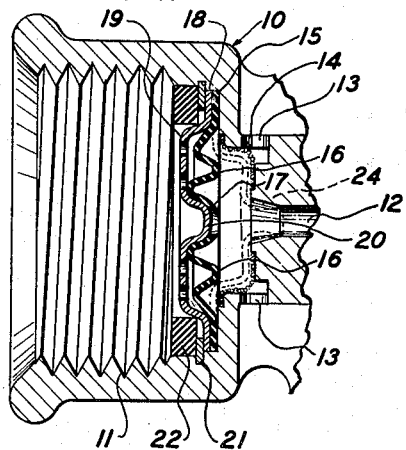

Referring to Fig. 1, the apparatus comprises a hollow body or conduit 10 having an internally threaded inlet end 11 and a coaxial outlet bore 12. Between the inlet and the outlet there are one or more vent passages 13 which open to atmosphere and communicate with the interior of the body through an annular screen 14. The inlet has a shoulder at its forward end against which rests an annular diaphragm 15 having annular corrugations 16 and an integral central forwardly protruding open ended nipple or neck 17. This diaphragm is made of rubber or other resilient material. Behind the diaphragm is a circular backing member 18 disposed entirely across the inlet end and provided with an annular perforated portion 19. The backing member has a forwardly protruding central button 20 on which the neck of the diaphragm is seated when there is no liquid flow through the device. The diaphragm and the backing are held in position by a recessed ring 21 in the inlet end and this in turn is backed by a conventional washer 22 to prevent leakage when the device is screwed onto a pipe, hose or the like.

When no liquid flows through the apparatus of Fig. 1 the diaphragm is seated against the backing, thus forming a seal. If suction is applied to the inlet neither gas nor liquid can be sucked back in the apparatus through the seal. When the pressure of the flowing liquid stream in the inlet is sufficient, the diaphragm is forced forward to the position shown by the dotted lines. Thus the neck enters a chamfered seat 24 at the rear of the outlet bore. The balance of the diagram is distended until it abuts the screen through which the apparatus is vented to atmosphere. At any time that the flow through the apparatus is insufficient to seat the neck of the diaphragm in the outlet bore, the apparatus is vented so that nothing can be sucked back from the outlet bore into the inlet of the apparatus. As previously pointed out, if suction develops in the inlet, the diaphragm will be sucked back against the backing to form a seal for both gas and liquid.

The neck, when undistended, is somewhat smaller than its seat in the outlet bore. Due to the small orifice in the neck, the water pressure when it is applied builds up rapidly and consequently distends the diaphragm rapidly. In other words, the movement of the neck into its seat is rapid. When the neck is in sealing position, the water continues to dilate the neck, until it is pressed tight against the seat, thus avoiding leakage of liquid outward and aspiration of gas inward.

The apparatus of Fig. 1 is particularly useful as an integral and permanent attachment in spray devices, for example, agricultural sprays which employ an eductor to suck a concentrated stream of insecticide or the like into a larger stream of water passing out of the outlet bore. In this way, back-syphoning and contamination of a water system are effectively avoided.

Figure 2:
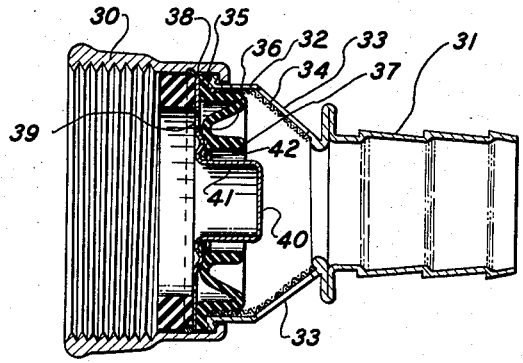

The apparatus of Fig. 2 is generally similar to that of Fig. 1, but is adapted to be permanently fastened on the inlet end of a hose. Thus the apparatus of Fig. 2 has an internally threaded inlet portion 30 and an outlet conduit 31 adapted to be fitted inside the hose (not shown). A coaxial intermediate or vent section 32 connects the inlet and the outlet portions. It is provided with large vents 33 to atmosphere. These vents are backed by a frusto-conical screen section 34 disposed within the vent member. A resilient diaphragm 35 with annular corrugations extends across the inlet member back of the vent member and is provided with an annular corrugated portion 36 and a forwardly protruding open ended neck 37 which is coaxial with the inlet, outlet, and vent members. A circular backing member 38 is disposed across the inlet immediately back of the diaphragm and has a perforated annular portion 39 and a solid central button portion 40 with a cylindrical wall 41 that protrudes toward the outlet member and is coaxial therewith. The neck has an integrally-formed wiper ring 42 inside it and this ring is adapted to slide forward in sealed relationship with the button.

When liquid, say water under pressure, is introduced into the inlet end of the apparatus of Fig. 2 it passes through the perforations in the backing and exerts pressure on the diaphragm which is urged forward toward the outlet member. When this occurs the wiper ring rides forward on the center portion of the backing member but maintains a seal until the neck portion of the diaphragm is extended into the outlet member. Once the neck is extended into the outlet member it is dilated against the wall of the member and thus seated. This prevents leakage. The diaphragm may be distended until it rests on the screen inside the vent section.

When the pressure of liquid at the inlet is interrupted, or when a suction is developed on the inlet, the diaphragm is pulled back to the position shown in Fig. 2, thus opening the vent and effectively sealing the inlet member. In other words, the apparatus of Fig. 2 like that of Fig. 1 acts both as a back flow valve and as a vacuum breaker.

Figure 3:
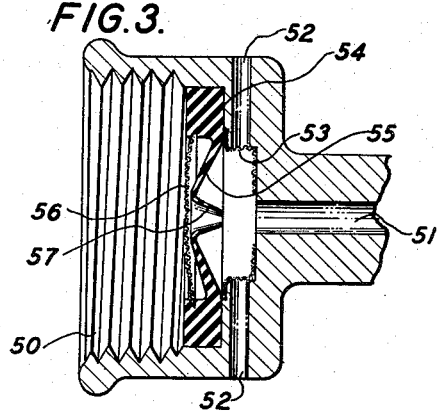
Fig. 3 is a longitudinal section through a simplified form of the apparatus of the invention adapted to act primarily as a vacuum breaker rather than as a back flow valve.

The apparatus of Fig. 3 is a simple form having a threaded inlet portion 50, a coaxial outlet bore 51, and vent bores 52 just behind the outlet bore. An annular screen 53 is disposed inside the apparatus to form a backing for the vents. Just behind the screen there is disposed a round resilient diaphragm 54 which fits snugly in the forward end of the inlet portion. It has a thin annular portion 55 of frusto-conical section which slopes backward and inward to a backing screen 56 disposed across the flow channel. An integrally-formed open-ended frusto-conical tubular neck 57 projects forward at the center of the diaphragm coaxial with the outlet bore. When the liquid pressure on the inlet is sufficient the diaphragm is urged forward so that the neck seats itself snugly in the outlet bore, thus sealing off the vents and permitting the flow from the inlet portion to the bore. When the pressure is reduced or interrupted, the diaphragm assumes the undistended position shown in Fig. 3, whereupon the apparatus is vented to atmosphere and air rather than liquid will be sucked back into the inlet if suction develops there. It will be noted that the apparatus of Fig. 3 prevents back flow by acting as a vacuum breaker, since the diaphragm does not act as a seal against back flow.

Figure 4:
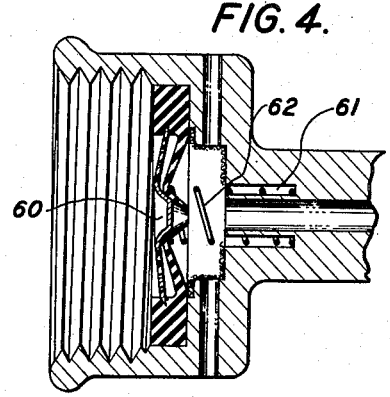
Fig. 4 is a longitudinal section through a modified form of the apparatus of Fig. 3 in which the backing member has a central solid section that cooperates with the neck on the diaphragm to seal against back flow, and which is provided with a helical spring to urge the diaphragm towards its backing.

The apparatus of Fig. 4 is in general the same as that of Fig. 3, like parts being designated by like reference characters. However, the backing behind the diaphragm has a solid forwardly protruding central boss or button 60 against which the neck of the diaphragm is seated when the diaphragm is undistended. An annular groove 61 is provided around the rear end of the outlet bore and contains one end of a helical compression spring 62, the opposite end of which presses against the diaphragm and holds it against the solid portion or button of the backing. The solid portion of the backing, as in the case of the backings shown in Figs. 1 and 2, cooperates with the diaphragm to form a seal when the flow of liquid forward through the apparatus is insufficient. The spring increases the positiveness of the action of the diaphragm and insures that it will retract when liquid pressure through the device is insufficient.

Figure 5:
Fig. 5 is a longitudinal section through a modified form of diaphragm having a spring imbedded therein.

The diaphragm 70 of Fig. 5 is in general similar to the diaphragm of the apparatus of Fig. 3. It is round and has an internal annulus 71 into which a circular backing may be inserted. The diaphragm proper is reinforced by an internal helical spring 72 which tends to hold the diaphragm in the position of Fig. 5 and to return it to that position when it is distended.

Figure 6:
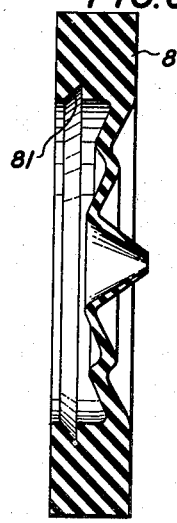
Fig. 6 is a longitudinal section through still another type of diaphragm for use in the apparatus of my invention.

The diaphragm 80 of Fig. 6 is the same as the diaphragm of Fig. 1, except that it is provided with an internal annulus 81 into which a backing member may be inserted. It will also be noted that the rim of the diaphragm in Fig. 6 like that of Figs. 3, 4 and 5, is relatively thick, so that it acts as a washer.

Figure 7:
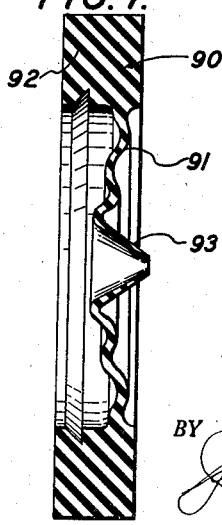
Fig. 7 is a longitudinal elevation illustrating a modification of the diaphragm of Fig. 6.

The diaphragm 90 of Fig. 7 is like that of Fig. 6 except that it has more annular corrugations 91 between the thick outer rim section 92 and the tapered central neck 93.

Although I have described my apparatus with particular reference to certain applications, it will be plain that it is of general utility and may be employed wherever a simple, positive-acting back flow arrester is required.

A back-flow interrupter constructed as shown in Fig. 1 was subjected to test. Water flow through the apparatus was interrupted 78 times per minute for a total of approximately 250,000 times. At the end of this period the diaphragm returned to shut off position and showed no signs of fatigue. The apparatus was then equipped with a new diaphragm and flow was sent through it continuously for 36 hours. At the end of this time the diaphragm returned to sealing position. In these cases no spring was employed to urge the diaphragm back to shut-off position. However, when the apparatus of the invention is to be used for long flow periods without interruption it is desirable to provide such a spring, as shown in the modifications illustrated in Figs. 4 and 5.

I claim:

1. In a device for preventing back flow of liquid, the combination which comprises a conduit for liquid having an inlet portion and an outlet portion, a vent in the conduit between the portions, a resilient diaphragm disposed across the conduit in the inlet portion adjacent the vent and having an open ended tubular neck extending toward the outlet portion remote from the outside edge of the diaphragm and located in the inlet portion when the diaphragm is undistended but movable into the outlet portion to seat therein when the diaphragm is distended by the pressure of liquid in the inlet portion, a backing disposed across the inlet portion immediately behind the diaphragm and having an unperforated portion adjacent the tubular neck which includes a projection extending toward the outlet conduit and inside the neck when the diaphragm is undistended and against which the diaphragm seals when it is undistended but provided with a passage for liquid in another region.

2. In a device for preventing back flow of liquid caused by a differential pressure, and for breaking a vacuum in a liquid system, the combination which comprises a conduit for liquid having an inlet and an outlet portion, a resilient diaphragm disposed across the conduit in the inlet portion having an open ended tubular neck extending toward the outlet portion, the neck being located in the inlet portion when the diaphragm is undistended and movable into the outlet portion to seat therein when the diaphragm is distended by the pressure of liquid in the inlet portion, the diaphragm moving in response to a differential pressure, a vent in the conduit between the portions and adjacent the diaphragm disposed so as to vent the conduit when the diaphragm is not in its distended position, thereby breaking any vacuum, and a backing disposed across the inlet portion immediately behind the diaphragm having an unperforated portion aligned with the tubular neck extending toward the outlet conduit and projecting inside the neck when the diaphragm is undistended, the diaphragm thus seating itself on the unperforated portion, the backing also having a passage for liquid in another region.

3. In a device for preventing back flow of liquid, and for breaking a vacuum in a liquid system, the combination which comprises a conduit for liquid having an inlet portion and an outlet portion, a resilient diaphragm disposed across the conduit in the inlet portion having an open ended tubular neck extending toward the outlet portion, the neck being located in the inlet portion when the diaphragm is undistended and movable into the outlet portion to seat therein when the diaphragm is distended by the pressure of liquid in the inlet portion, a vent in the conduit between the portions and adjacent the diaphragm disposed so as to vent the conduit when the diaphragm is not in its distended position, thereby breaking any vacuum, separate springing means to urge the diaphragm toward the inlet portion, and a backing disposed across the inlet portion immediately behind the diaphragm having an unperforated portion aligned with the tubular neck extending toward the outlet conduit, and projecting inside the neck when the diaphragm is undistended, the diaphragm thus seating itself on the unperforated portion, the backing also having a passage for liquid in another region.

4. In a device for preventing back flow of liquid caused by differential pressure, and for breaking a vacuum in a liquid system, the combination which comprises a conduit for liquid having an inlet portion and an outlet portion, a resilient diaphragm disposed across the conduit in the inlet portion having an open ended tubular neck extending toward the outlet portion, the neck being located in the inlet portion when the diaphragm is undistended and movable into the outlet portion to seat therein when the diaphragm is distended by the pressure of liquid in the inlet portion, the diaphragm moving in response to a differential pressure, a vent in the conduit between the portions and adjacent the diaphragm disposed so as to vent the conduit when the diaphragm is not in its distended position, thereby breaking any vacuum, and a backing disposed across the inlet portion immediately behind the diaphragm having an unperforated portion aligned with the tubular neck extending toward the outlet conduit, and projecting inside the neck when the diaphragm is undistended, the unperforated portion having the same shape as the inner surface of the neck so as to provide a tight seal when the diaphragm seats itself on the unperforated portion, the backing also having a passage for liquid in another region.

5. In a device for preventing back flow of liquid, and for breaking a vacuum in a liquid system, the combination which comprises a conduit for liquid having an inlet portion and an outlet portion, a resilient diaphragm disposed across the conduit in the inlet portion having an open ended tubular neck extending toward the outlet portion, the neck being located in the inlet portion when the diaphragm is undistended and movable into the outlet portion to seat therein when the diaphragm is distended by the pressure of liquid in the inlet portion, a vent in the conduit between the portions and adjacent the diaphragm disposed so as to vent the conduit when the diaphragm is not in its distended position, thereby breaking any vacuum, and a perforated backing disposed across the inlet portion immediately behind the diaphragm having an unperforated portion aligned with the tubular neck extending toward the outlet conduit, and projecting inside the neck when the diaphragm is undistended, the diaphragm thus seating itself on the unperforated portion.

STANLEY A. HAYES.

References Cited in the file of this patent

UNITED STATES PATENTS

| Number | Name | Date |
|---|---|---|
| 1,849,475 | Bottoms | Mar. 15, 1932 |
| 2,033,955 | Robinovitz | Mar. 17, 1936 |
| 2,092,757 | Groeniger | Sept. 14, 1937 |
| 2,167,399 | Wagner | July 25, 1939 |
| 2,174,742 | Groeniger | Oct. 3, 1939 |
| 2,292,373 | Groeniger | Aug. 11, 1942 |
| 2,322,631 | Groeniger | June 22, 1943 |
| 2,371,449 | Groeniger | Mar. 13, 1945 |
| 2,516,578 | Kreiner | July 25, 1950 |
| 2,572,308 | Brown | Oct. 23, 1951 |